(12) United States Patent
Sheth et al.

(10) Patent No.: US 12,363,431 B2
(45) Date of Patent: Jul. 15, 2025

(54) USE OF DISTANT MEASUREMENT TO AID IN VISION APPLICATIONS IN HANDHELD SCANNER DEVICES

(71) Applicant: ZEBRA TECHNOLOGIES CORPORATION, Lincolnshire, IL (US)

(72) Inventors: Maulin Sheth, Central Islip, NY (US); Kalugama Gardialge Akila Buddika Peiris, Holbrook, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 163 days.

(21) Appl. No.: 18/132,874

(22) Filed: Apr. 10, 2023

(65) Prior Publication Data
US 2024/0340534 A1 Oct. 10, 2024

(51) Int. Cl.
*H04N 23/67* (2023.01)
*G06V 10/25* (2022.01)

(52) U.S. Cl.
CPC .......... *H04N 23/676* (2023.01); *G06V 10/25* (2022.01)

(58) Field of Classification Search
CPC ....... H04N 23/676; H04N 23/67; G06V 10/25
See application file for complete search history.

(56) References Cited

U.S. PATENT DOCUMENTS

| | | | | |
|---|---|---|---|---|
| 11,108,946 | B1 * | 8/2021 | Gurevich | G06K 7/10811 |
| 2006/0038017 | A1 * | 2/2006 | Carlson | G02B 7/08 |
| | | | | 235/462.24 |
| 2007/0063048 | A1 * | 3/2007 | Havens | G06K 7/10702 |
| | | | | 235/462.46 |
| 2022/0210301 | A1 * | 6/2022 | Biasini | H04N 23/55 |

* cited by examiner

*Primary Examiner* — Christopher K Peterson
(74) *Attorney, Agent, or Firm* — Yuri Astvatsaturov

(57) ABSTRACT

Imaging devices, systems, and methods for capturing and processing images for vision applications in a non-fixed environment are described herein. An example system includes: an imaging assembly, an aiming assembly, and one or more imaging processors configured to: (a) receive a first image; (b) analyze at least a portion of the first image to determine a first focus value; (c) configure a focus parameter of the imaging assembly based on the first focus value; (d) receive a subsequent image; (e) determine a blurriness value for at least a portion of the subsequent image; (f) responsive to the blurriness value being less than a predetermined threshold value, transmit the subsequent image to a decode module; and (g) responsive to the blurriness value exceeding the predetermined threshold value: determine a subsequent focus value; (ii) configure the focus parameter based on the subsequent focus value; and (iii) repeat (d) through (g).

30 Claims, 8 Drawing Sheets

USE OF DISTANT MEASUREMENT TO AID IN VISION APPLICATIONS IN HANDHELD SCANNER DEVICES

BACKGROUND

Barcode reading systems have long been used to capture and decode barcode data, which is then used to look up information regarding the item in question. In particular, barcode reading systems often use an aiming assembly to direct and focus an imaging assembly such that the imaging assembly may capture a clear image for decoding purposes. However, errors in aiming, stability, focusing, etc. may cause an imaging assembly to capture a blurry image. Such an image is presently transmitted to a decode module that tries and fails to decode barcode data due to the blur in the image obscuring the barcode or other decode indicia. Such a process is inefficient and leads to wasted resources, time, and overall bandwidth for a system. As such, a system that can more efficiently focus an imaging system and capture clear images for decoding is desired.

SUMMARY

In an embodiment, a variable focus imaging system is provided. The system includes: an imaging assembly configured to capture a plurality of images of an environment appearing in a field of view (FOV) and an aiming assembly configured to project an aim pattern in the FOV. The system further includes one or more imaging processors configured to receive the plurality of images from the imaging assembly and a computer-readable media storing machine readable instructions that, when executed, cause the one or more imaging processors to: (a) receive a first image of the plurality of images from the imaging assembly; (b) analyze at least a portion of the first image to determine a first focus value based on the aim pattern in the FOV; (c) configure a focus parameter of the imaging assembly based on the first focus value; (d) receive a subsequent image of the plurality of images from the imaging assembly; (e) determine a blurriness value for at least a portion of the subsequent image; (f) responsive to the blurriness value being less than a predetermined threshold value, transmit the subsequent image to a decode module; and (g) responsive to the blurriness value exceeding the predetermined threshold value: (i) determine a subsequent focus value that is different than any preceding focus values, the preceding focus values including the first focus value; (ii) configure the focus parameter of the imaging assembly based on the subsequent focus value; and (iii) repeat (d) through (g).

In a variation of the embodiment, the imaging assembly includes an actuator and configuring the focus parameter includes transmitting, to the imaging assembly, a command to adjust a position of the actuator.

In another variation of the embodiment, repeating (d) through (g) includes: determining the blurriness value by determining a subsequent blurriness value; and determining the subsequent focus value by: determining that a subsequent blurriness value is greater than a preceding blurriness value; and determining the subsequent focus value based at least on the determining that the subsequent blurriness value is greater than a preceding blurriness value.

In yet another variation of the embodiment, the command to adjust the position is a command to adjust the position in a first direction and repeating (d) through (g) includes configuring the focus parameter based on the subsequent blurriness value by transmitting, to the imaging assembly, a command to adjust a position of the actuator in a second direction opposite of the first direction.

In still yet another variation of the embodiment, repeating (d) through (g) includes: determining the blurriness value by determining a subsequent blurriness value; and determining the subsequent focus value by: determining that a subsequent blurriness value is less than a preceding blurriness value; and determining the subsequent focus value based at least on the determining that the subsequent blurriness value is less than a preceding blurriness value.

In another variation of the embodiment, the command to adjust the position is a command to adjust the position in a first direction and repeating (d) through (g) includes: configuring the focus parameter based on the subsequent blurriness value by transmitting, to the imaging assembly, a command to adjust the position of the actuator further in the first direction.

In yet another variation, the at least a portion of the subsequent image includes a region of interest including a predetermined area surrounding the aim pattern in the FOV.

In yet another variation, the at least a portion of the subsequent image includes a region of interest including a predetermined percentage of the FOV positioned on a central axis of the subsequent image.

In still yet another variation, determining the blurriness value includes: calculating a variance of a gradient divergence for the at least the portion of the subsequent image; and generating the blurriness value based on the variance.

In another variation, determining the blurriness value includes: shifting image data associated with the subsequent image into frequency domain data; calculating a magnitude spectrum associated with the frequency domain data; and generating the blurriness value based on the magnitude spectrum.

In another embodiment, a method for capturing images via one or more imaging processors configured to receive a plurality of images of an environment appearing in a field of view (FOV) from an imaging assembly is provided. The method includes: (a) receiving a first image of the plurality of images from the imaging assembly; (b) analyzing at least a portion of the first image to determine a first focus value based on an aim pattern in the FOV projected by an aiming assembly; (c) configuring a focus parameter of the imaging assembly based on the first focus value; (d) receiving a subsequent image of the plurality of images from the imaging assembly; (e) determining a blurriness value for at least a portion of the subsequent image; (f) responsive to the blurriness value being less than a predetermined threshold value, transmitting the subsequent image to a decode module; and (g) responsive to the blurriness value exceeding the predetermined threshold value: (i) determining a subsequent focus value that is different than any preceding focus values, the preceding focus values including the first focus value; (ii) configuring the focus parameter of the imaging assembly based on the subsequent focus value; and (iii) repeating (d) through (g).

In yet another embodiment, a device configured to receive a plurality of images of an environment appearing in a field of view (FOV) from an imaging assembly is provided. The device includes: one or more imaging processors configured to receive the plurality of images from the imaging assembly; and a computer-readable media storing machine readable instructions that, when executed, cause the one or more imaging processors to: (a) receive a first image of the plurality of images from the imaging assembly; (b) analyze at least a portion of the first image to determine a first focus value based on an aim pattern in the FOV projected by an aiming assembly; (c) configure a focus parameter of the imaging assembly based on the first focus value; (d) receive a subsequent image of the plurality of images from the imaging assembly; (e) determine a blurriness value for at least a portion of the subsequent image; (f) responsive to the blurriness value being less than a predetermined threshold value, transmit the subsequent image to a decode module; and (g) responsive to the blurriness value exceeding the predetermined threshold value: (i) determine a subsequent focus value that is different than any preceding focus values, the preceding focus values including the first focus value; (ii) configure the focus parameter of the imaging assembly based on the subsequent focus value; and (iii) repeat (d) through (g).

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention and explain various principles and advantages of those embodiments.

Figure 1:
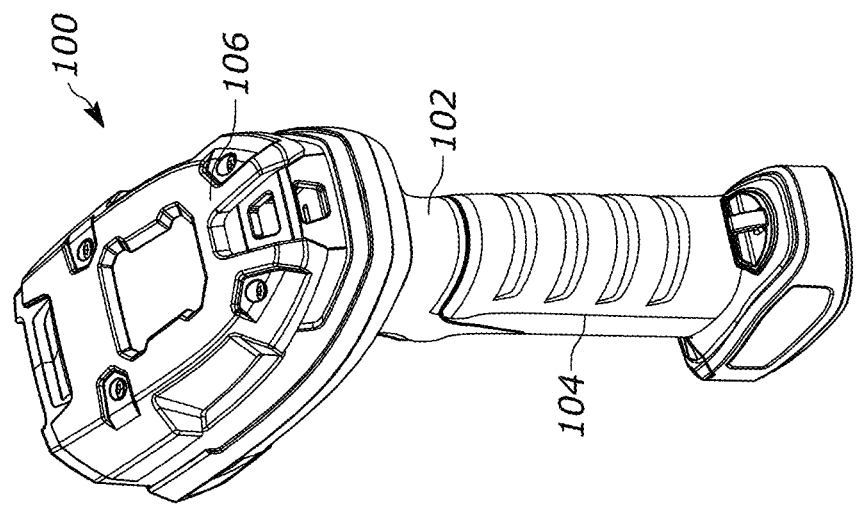
FIG. 1 illustrates a perspective front and back view of an example scanner in accordance with various embodiments.
Figure 1:
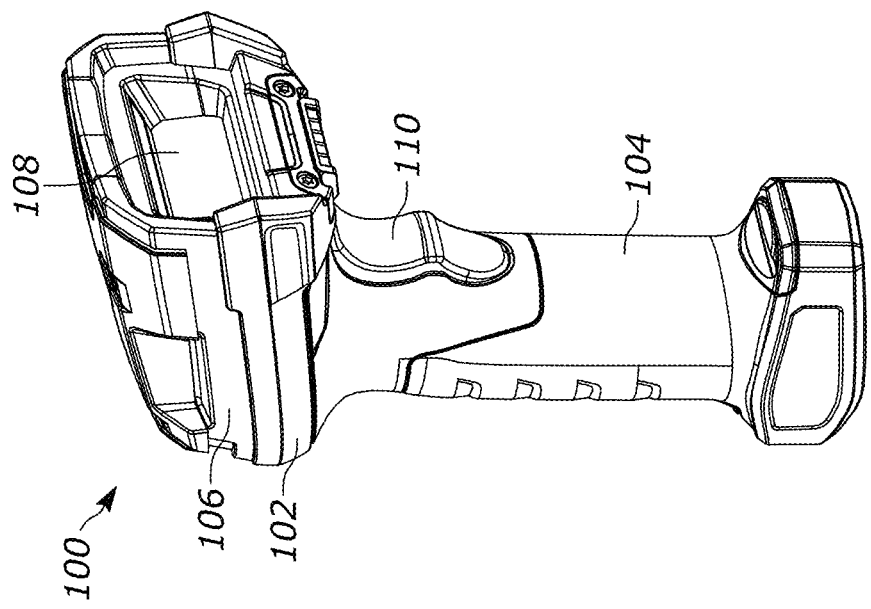

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Generally speaking, one or more imaging processors (e.g., a scanning framework) comprising or communicating with a scanning device (e.g., including a scan engine) and running a blur detection algorithm to determine whether to discard a blurry image and adjust the scanning device or transmit a clear image to a decode module are provided. Existing systems transmit captured images to a decode module regardless of blurriness, and the decode module attempts to decode any decode indicia in the image until a failure protocol activates and the decode module discards the image while sending an error or failure message to the imaging processor(s).

By using a blur detecting algorithm at the imaging processor(s), the exemplary systems described herein offer improved functionality by reducing the wasted resources used, reducing the time spent attempting to decode blurry images, reducing the bandwidth utilized in transmitting images back and forth between the imaging processor(s) and the decode module, and improving the functionality of an imaging assembly by adjusting the imaging assembly components during and/or in-between image capture processes by the imaging assembly. Moreover, a system utilizing the techniques described herein my reduce power and processor cycles consumed by the system, as the decode module spends less time active and attempting to decode images, instead only functioning to decode images that are clear enough to be decoded.

Turning to the Figures, FIG. 1 illustrates an exemplary barcode reader 100 having a housing 102 with a handle portion 104 and a head portion 106. The head portion 106 includes a window 108 and is configured to be positioned on the top of the handle portion 104. The head portion 106 includes an imaging lens (e.g., imaging lens 244 as described with regard to FIG. 2 below) that, depending on the implementation, is and/or includes a variable focus optical element.

The handle portion 104 is configured to be gripped by a reader user (not shown) and includes a trigger 110 for activation by the user. Optionally included in an embodiment is a base portion (not shown), which may be attached to the handle portion 104 opposite the head portion 106 and is configured to stand on a surface and support the housing 102 in a generally upright position. The barcode reader 100 can be used in a hands-free mode as a stationary workstation when it is placed on a countertop or other workstation surface. The barcode reader 100 can also be used in a handheld mode when it is picked up off the countertop or base station and held in an operator's hand. In the hands-free mode, products can be slid, swiped past, or presented to the window 108 for the reader to initiate barcode reading operations. In the handheld mode, the barcode reader 100 can be moved towards a barcode on a product, and the trigger 110 can be manually depressed to initiate imaging of the barcode.

Other implementations may provide only handheld or only hands-free configurations. In the embodiment of FIG. 1, the reader 100 is ergonomically configured for a user's hand as a gun-shaped housing 102, though other configurations may be utilized as understood by those of ordinary skill in the art. As shown, the lower handle 104 extends below and rearwardly away from the body 102 along a centroidal axis obliquely angled relative to a central FOV axis of a FOV of an imaging assembly within the scanning head 102.

Figure 2:
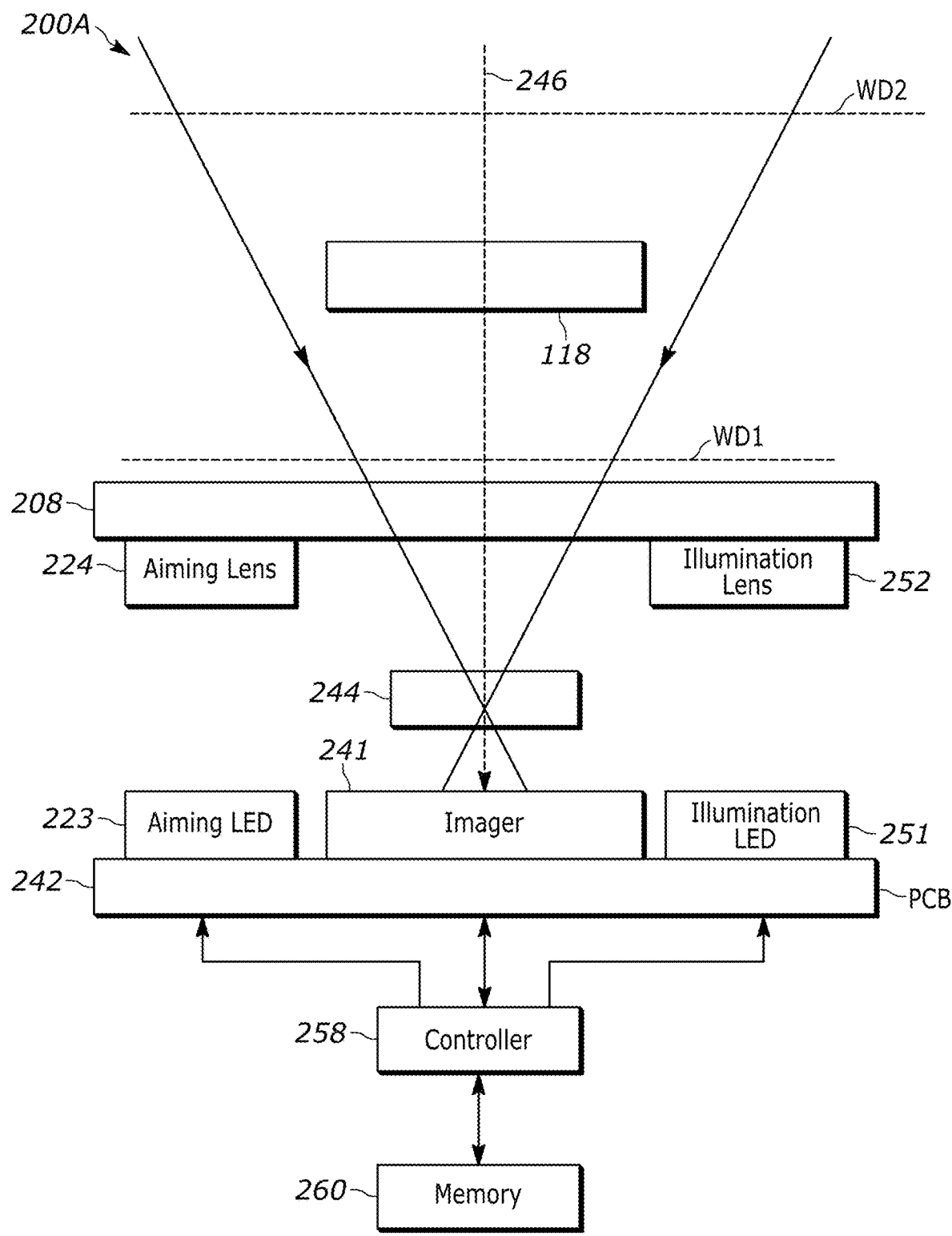
FIG. 2 illustrates a block diagram of an example imaging device such as the example scanner of FIG. 1.

Referring next to FIG. 2, a block diagram of an example architecture for an imaging device such as handheld imaging device 100 is shown. For at least some of the reader implementations, an imaging assembly 245 includes a light-detecting sensor or imager 241 operatively coupled to, or mounted on, a printed circuit board (PCB) 242 in the imaging device 200 as shown in FIG. 2. In an implementation, the imager 241 is a solid-state device, for example, a CCD or a CMOS imager, having a one-dimensional array of addressable image sensors or pixels arranged in a single row, or a two-dimensional array of addressable image sensors or pixels arranged in mutually orthogonal rows and columns, and operative for detecting return light captured by an imaging assembly 245 over a field of view along an imaging axis 246 through the window 208. The imager 241 may also include and/or function as a monochrome sensor and, in further implementations, a color sensor. It should be understood that the terms "imager", "image sensor", and "imaging sensor" are used interchangeably herein. Depending on the implementation, imager 241 may include a color sensor such as a vision camera in addition to and/or as an alternative to the monochrome sensor. In some implementations, the imager 241 is or includes a barcode reading module (e.g., a monochromatic imaging sensor). In further implementations, the imager 241 additionally or alternatively is or includes a vision camera (e.g., a color imaging sensor). It will be understood that, although imager 241 is depicted in FIG. 2 as a single block, that imager 241 may be multiple sensors spread out in different locations of imaging device 200.

The return light is scattered and/or reflected from an object 118 over the field of view. The imaging lens 244 is operative for focusing the return light onto the array of image sensors to enable the object 118 to be imaged. In particular, the light that impinges on the pixels is sensed and the output of those pixels produce image data that is associated with the environment that appears within the FOV (which can include the object 118). This image data is typically processed by a controller (usually by being sent to a decoder) which identifies and decodes decodable indicia captured in the image data. Once the decode is performed successfully, the reader can signal a successful "read" of the object 118 (e.g., a barcode). The object 118 may be located anywhere in a working range of distances between a close-in working distance (WD1) and a far-out working distance (WD2). In an implementation, WD1 is about one-half inch from the window 208, and WD2 is about thirty inches from the window 208.

In some implementations, the imaging lens 244 includes a variable focus optical element. In further implementations, the variable focus optical element is a lens operated and/or adjusted by a ball-bearing motor lens or a voice coil motor (VCM) actuator (i.e., a VCM lens). In implementations in which the variable focus optical element is a ball-bearing motor or VCM lens, the ball-bearing motor or VCM lens may have a focus range from 0.5 inches extending infinitely (i.e., to optical infinity). In further embodiments, the variable focus optical element may be any lens or optical element with a similar capability to adjust focus, such as a liquid lens, a T-lens, a ball-bearing focusing actuator and any other similar lens known in the art. Depending on the implementation, the controller 258 may control the variable focus optical element.

An illuminating light assembly may also be mounted in, attached to, or associated with the imaging device 200. The illuminating light assembly includes an illumination light source 251, such as at least one light emitting diode (LED) and at least one illumination lens 252, and preferably a plurality of illumination and illumination lenses, configured to generate a substantially uniform distributed illumination pattern of illumination light on and along the object 118 to be imaged by image capture. Although FIG. 2 illustrates a single illumination light source 251, it will be understood that the illumination light source 251 may include more light sources. At least part of the scattered and/or reflected return light is derived from the illumination pattern of light on and along the object 118.

An aiming light assembly may also be mounted in, attached to, or associated with the imaging device 200 and preferably includes an aiming light source 223, e.g., one or more aiming LEDs or laser light sources, and an aiming lens 224 for generating and directing a visible aiming light beam away from the imaging device 200 onto the object 118 in the direction of the FOV of the imager 241.

Further, the imager 241, the illumination source 251, and the aiming source 223 are operatively connected to a programmed microprocessor or controller 258 operative for controlling the operation of these components. Depending on the implementation, the controller 258 is, is part of, or includes the controller 107 as described above with regard to FIGS. 1A-1E. In some implementations, the controller 258 is or includes an imaging processor as described herein. In further implementations, the controller 258 functions as or is communicatively coupled to an imaging processor for receiving, processing, and/or analyzing the image data captured by the imagers.

A memory 260 is connected and accessible to the controller 258. Preferably, the controller 258 is the same as the one used for processing the captured return light from the illuminated object 118 to obtain data related to the object 118. Though not shown, additional optical elements, such as collimators, lenses, apertures, compartment walls, etc. may be provided in the housing. Although FIG. 2 shows the imager 241, the illumination source 251, and the aiming source 223 as being mounted on the same PCB 242, it should be understood that different implementations of the imaging device 200 may have these components each on a separate PCB, or in different combinations on separate PCBs. For example, in an implementation of the imaging device 200, the illumination LED source is provided as an off-axis illumination (i.e., has a central illumination axis that is not parallel to the central FOV axis).

In some implementations, the object 118 is or includes an indicia for decoding (e.g., a decode indicia), such as a barcode, a QR code, a label, a UPC code, a digital matrix code, etc. In further implementations, the object 118 is or includes a digital watermark, the digital watermark may include a plurality of repeating barcodes, product codes, code patterns, or other such indicia that comprise the digital watermark. In some such implementations, the digital watermark is invisible or near-invisible to the human eye but is able to be detected and/or imaged by an imaging device 200.

Figure 3A:
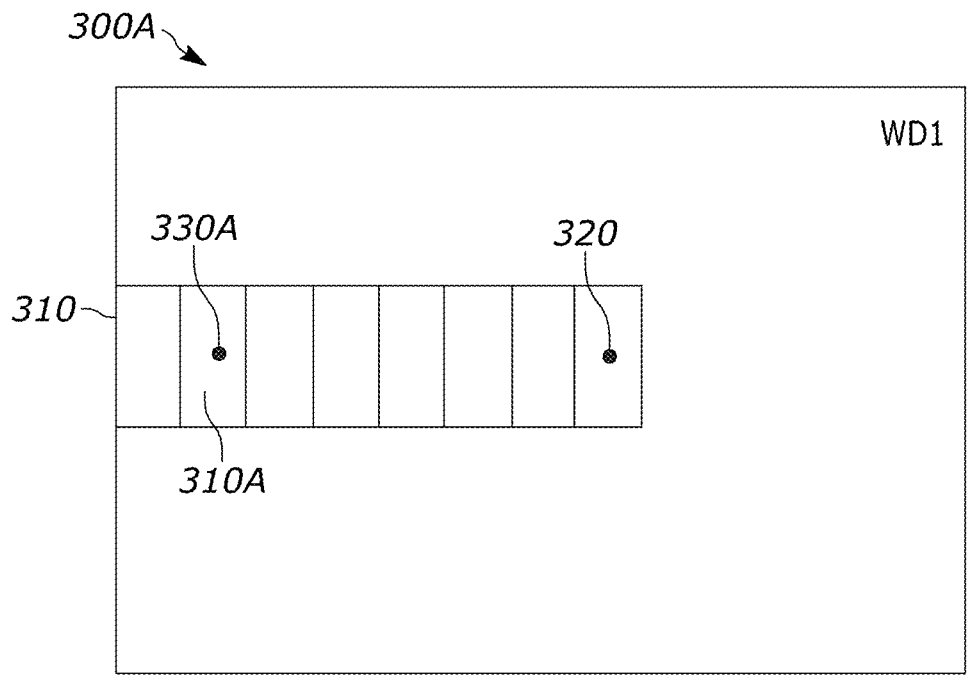
FIG. 3A illustrates an example aiming pattern on an object located at a close-in distance from an example imaging device, such as the example imaging device of FIG. 2.
Figure 3B:
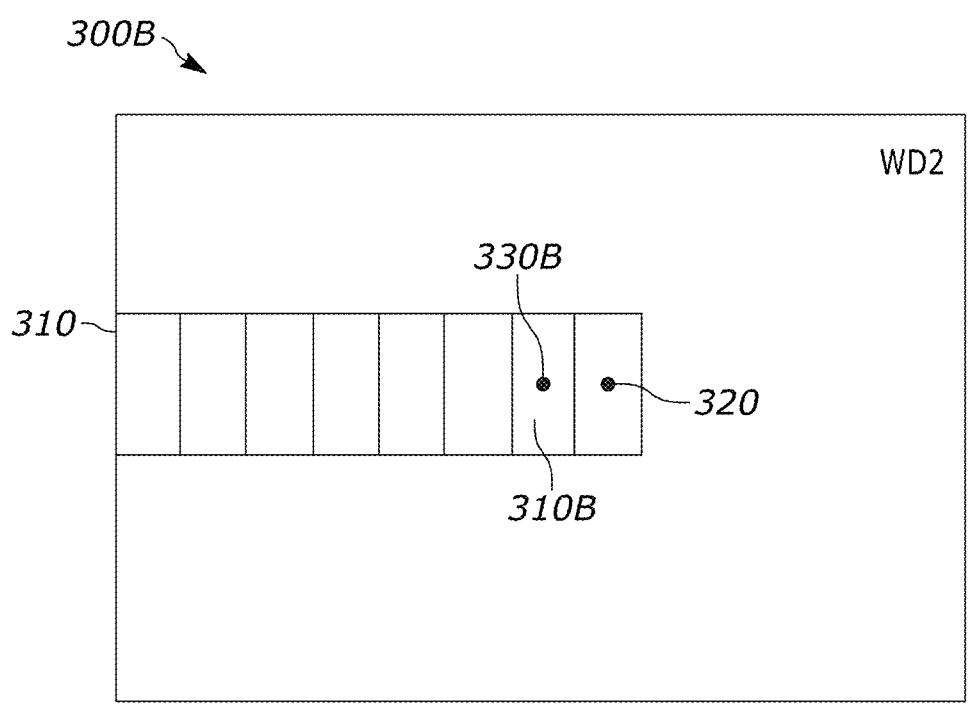
FIG. 3B illustrates an example aiming pattern on an object located at a far-out distance from an example imaging device, such as the example imaging device of FIG. 2.

FIGS. 3A and 3B illustrate aim patterns in a close-in FOV 300A and far-out FOV 300B at a close-in working distance (WD1) and a far-out working distance (WD2), respectively. In particular, an imaging device 200 determines (e.g., via a controller such as controller 258) a distance between a center point 320 and an aim pattern 330A and 330B (e.g., as projected by an aiming module such as aiming LED 223 and aiming lens 224) to determine a distance between the imaging device 200 and the object being imaged, such as object 118.

In particular, the FOVs 300A and 300B are divided into an equal number of imaging regions 310. It will be understood that, although the exemplary embodiments of FIGS. 3A and 3B depict eight imaging regions 310 of equal size, that the imaging device 200 may, depending on the embodiment, divide the FOVs 300A and 300B into four regions, sixteen regions, thirty-two regions, etc. Similarly, the imaging regions 310 may be of different shapes and/or sizes.

Based on which region the aiming pattern 330A and/or 330B falls into, the imaging device 200 determines a distance between the imaging device 200 and the object 118. For example, in the exemplary embodiment of FIG. 3A, the imaging device 200 determines that the aim pattern 330A is in a second region 310A (e.g., six regions away from the center 320 (e.g., according to the imaging axis 246)), and subsequently determines that the object 118 is at WD1 (e.g., ½ inch, 1 inch, 2 inches, etc.). Similarly, in the exemplary embodiment of FIG. 3B, the imaging device 200 determines that the aim pattern 330B is in a seventh region 310B (e.g., one region away from the center 320), and subsequently determines that the object 118 is at WD2 (e.g., 32 inches, 40 inches, 48 inches, etc.). As such, the imaging device 200 uses parallax techniques to determine a distance between the imaging system and the object.

Figure 4A:
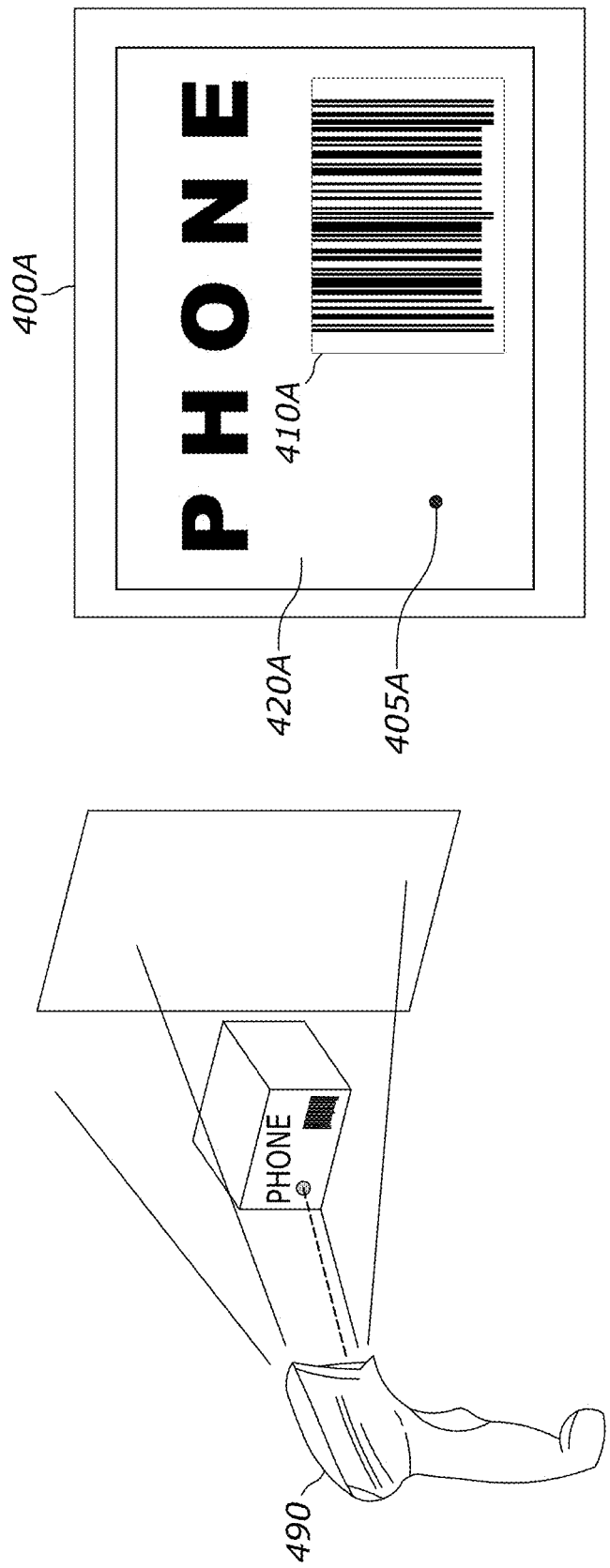
FIG. 4A illustrates an example field of view (FOV) in which an example imaging device aims an aiming pattern onto an object and focuses on the object.
Figure 4B:
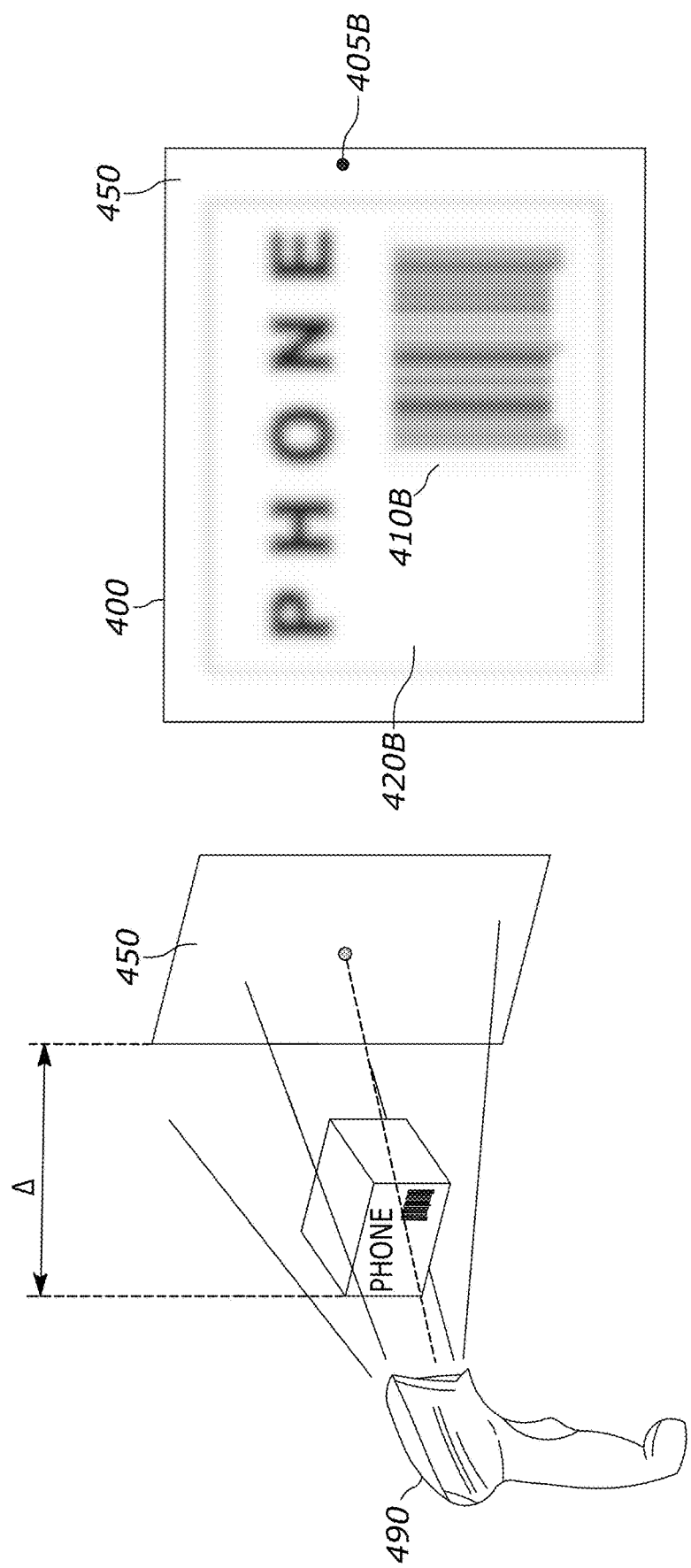
FIG. 4B illustrates an example FOV in which an example imaging device aims an aiming pattern beyond an object, causing images of the object to be blurry.

Referring next to FIGS. 4A and 4B, an imaging device 490 (e.g., barcode scanner 100, imaging device 200, etc.) focuses to capture images of a FOV 400. In particular, FIG. 4A depicts an embodiment in which the imaging device 490 properly aims an aiming pattern 405A onto an object 420A, and the imaging device 490 focuses on the object 420A. As such, the object 420A and a decode indicia 410A associated with the object 420A are focused (e.g., clear) in the image of the FOV 400.

FIG. 4B, however, depicts an embodiment in which the imaging device 490 aims an aiming pattern 405B past the object 420B, and instead the imaging device 490 focuses on a second object 450 (e.g., a wall) a distance A away from the object 420B. As such, the object 420B and a decode indicia 410B associated with the object 420B appear out-of-focus (e.g., blurry) in an image of the FOV 400.

In some conventional devices, a decode module would be unable to decode the decode indicia and would discard the image in FIG. 4B before sending a decode failure message to an imaging processor, wasting resources, time, bandwidth, and power. Using the instant techniques as described below, however, the imaging processor determines that a blurriness value for FIG. 4B is above a blurriness threshold and transmits instructions to the imaging assembly to modify a focus value of the imaging assembly (e.g., an actuator position for the imaging assembly). As such, the imaging assembly captures and transmits a clear image to a decode module, which is able to decode the decode indicia.

It will be understood that a dotted pattern in the figures (e.g., FIG. 4B or FIG. 6A) is representative of blur and the image behind is clear for the sake of understandability only.

Figure 5:
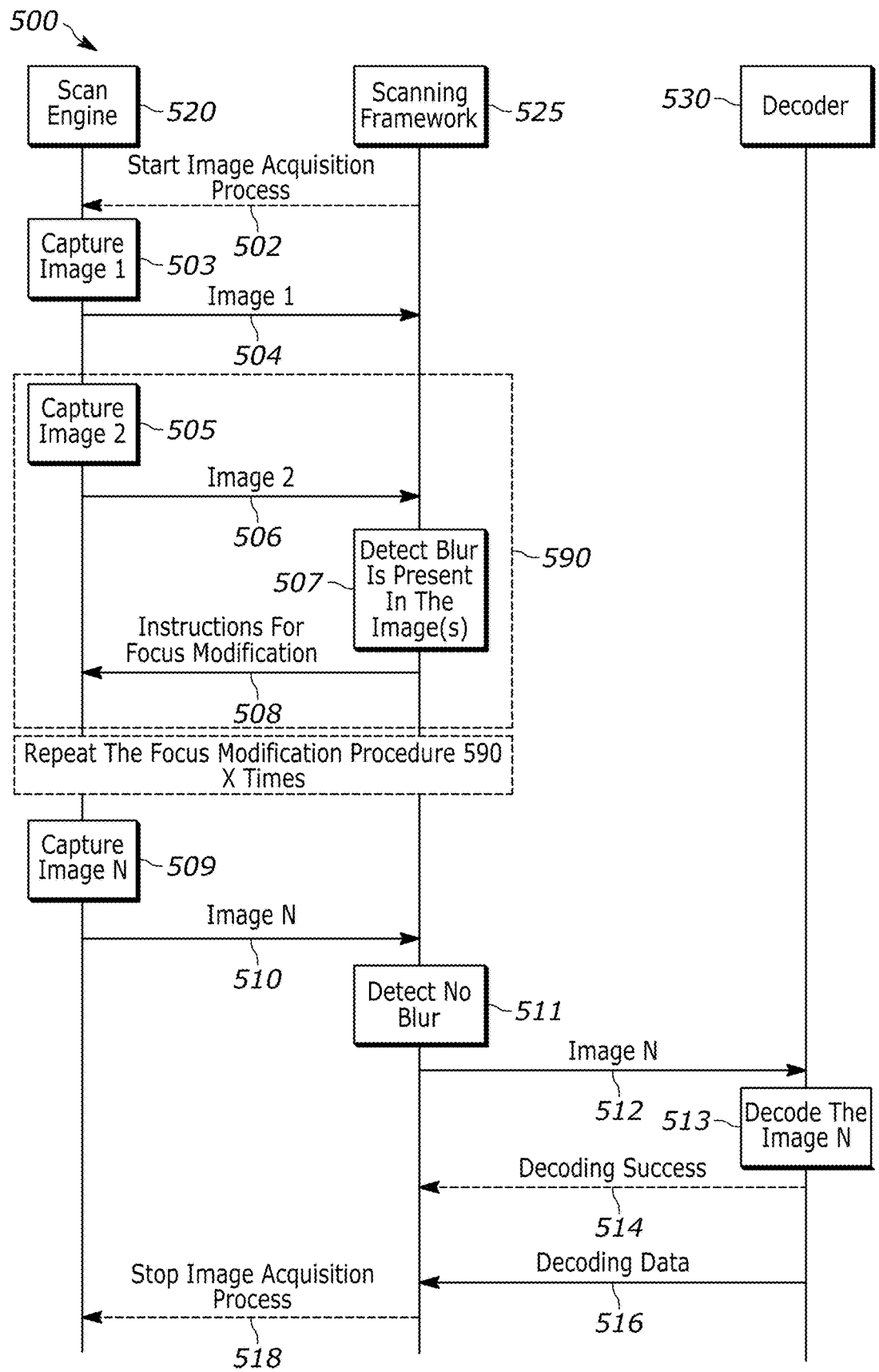
FIG. 5 illustrates a messaging diagram of an example scenario for capturing images and detecting whether blur is present in the captured images according to the techniques described herein.

Referring next to FIG. 5, in a scenario 500, a scanning framework 525 communicates with a scan engine 520 and a decoder 530. Depending on the implementation, some of the scan engine 520, scanning framework 525, and/or decoder 530 may be components of the same device and messages as described below may be or include signals or other indications that are transmitted internally. In further implementations, each of the scan engine 520, scanning framework 525, and decoder 530 are different devices and transmit messages between the devices.

In the scenario 500, the scanning framework 525 initializes the scenario 500 by transmitting 502 an indication to the scan engine 520 to start an image acquisition process. In some implementations, the scanning framework 525 receives an indication to start the image acquisition process from the scan engine 520 (e.g., a request to start the image acquisition process, a first image taken as part of the image acquisition process, an indication of a presence of an object, etc.), and the scanning framework 525 transmits 502 the message or a confirmation in response. In further implementations, the scanning framework 525 receives the indication to start the image acquisition process from the scan engine 520 and both the scan engine 520 and the scanning framework 525 proceed without the scanning framework 525 transmitting 502 the message.

As part of the image acquisition process, the scan engine 520 captures 503 a first image (e.g., image 1) and transmits 504 the image to the scanning framework 525. The scan engine 520 then captures 505 a second image (e.g., image 2) and transmits 506 the image to the scanning framework 525. Although the scenario 500 depicts the scan engine 520 capturing and transmitting the images in sequential order, it will be understood that the scan engine 520 may alternatively capture multiple images before transmitting the images to the scanning framework 525. Similarly, the scan engine 520 may transmit multiple images in the same message or transmit the images separately.

After receiving 506 the second image, the scanning framework 525 analyzes the images to detect 507 whether blur is present in the images. In some implementations, the scanning framework 525 analyzes the entire image for blur. In further implementations, the scanning framework 525 analyzes a particular region of interest (ROI) for blur. In some such implementations, the scanning framework 525 uses an area of predetermined size surrounding an aim dot, aim pattern, and/or other illumination from an aiming module (e.g., aiming module 170), as described in more detail below with regard to FIGS. 5A-6B.

In some implementations, to analyze the image and/or ROI for blur, the scanning framework 525 uses a Laplacian blur detection algorithm to determine a variance of the Laplacian values for the pixels to determine whether blur is present in the image and/or ROI. In further implementations, the scanning framework 525 uses a Fast Fourier Transform (FFT) blur detection algorithm to shift the image to the frequency domain and compute a magnitude spectrum of the reconstructed image determine whether blur is present. The scanning framework 525 performs the detection 507 in real time (e.g., after the scan engine 520 captures 505 image 2 but before the scan engine 520 captures another image). As such, the scanning framework 525 may perform the detection 507 fast enough to detect in between image captures (e.g., less than 16.67 ms, less than 15 ms, less than 10 ms, etc.).

As an example, analyzing the image and/or ROI for blur may include converting the image to a single channel luminance image if the image is a colored image. Further, the scanning framework 525 may then perform the blur detection by first using an FFT or Laplace transformation on the image. In some examples, the scanning framework 525 performs the Laplacian transformation according to a matrix based on a Laplacian operator, such as $$\nabla^2 f = \left(\frac{\partial^2 f}{\partial^2 x}\right) + \left(\frac{\partial^2 f}{\partial^2 y}\right) =$$

$$[f(x+1, y) + f(x-1, y) + f(x, y+1) + f(x, y-1)] - 4f(x, y)$$

for a 3 by 3 matrix filter. The scanning framework 525 may then apply the filter to an image to determine an output and determine a divergence of a gradient for the function f (e.g., a standard deviation/variance), such as Δf(x, y)=div(grad (f)). The scanning framework then compares the determined output to a threshold value (e.g., 170) to determine if the image is blurry.

The scanning framework 525 may be preprogrammed with or receive an indication of (e.g., from the decoder 530) a threshold blurriness value that determines whether an image is too blurry for the decoder 530 to use. If the scanning framework 525 detects no or low blur, then the scenario 500 may proceed directly to event 512. Otherwise, the scenario proceeds to event 508.

After the scanning framework 525 detects 507 that blur is present in the images, the scanning framework 525 transmits 508 instructions to the scan engine 520 to adjust the scan engine focus. In some implementations, the instructions include instructions to adjust the position of an actuator controlling the focus of the lens (e.g., to turn clockwise or counterclockwise, to move along an axis, to tilt, etc.).

The procedure from capturing 505 the second image to transmitting 508 the instructions (e.g., events 505, 506, 507, and 508) may be collectively referred to as a focus modification procedure 390.

After receiving the instructions, the scan engine 520 adjusts the focus accordingly and may perform the focus modification procedure 390 again X times. Eventually, the scan engine 520 captures 509 an Nth image (e.g., image N) and transmits 510 the image to the scanning framework 525, where the scanning framework 525 detects 511 no blur. The scanning framework 525 then transmits 512 the image to the decoder 530, which decodes 513 the image N, the ROI of image N, and/or scan indicia (e.g., a barcode, QR code, watermark, etc.) visible in the image N.

In some implementations, after decoding 513 the image N, the decoder 530 transmits 514 an indication that the decoding operation succeeded (e.g., a decoding success message). The decoder 530 then transmits 516 the decoded data to the scanning framework 525. In some implementations, the decoder 530 transmits 514/516 the success message and the decoded data in the same message. In other implementations, the decoder 530 only transmits 516 the decoded data. After receiving 514/516 the success message and/or the decoded data, the scanning framework 525 then, depending on the implementation, transmits 518 an indication to the scan engine 520 to stop the image acquisition process. In further implementations, the scanning framework 525 instead transmits an indication to begin a new scanning job.

Figure 6A:
FIG. 6A illustrates an example blurry image captured by an example imaging device, such as the example imaging device of FIG. 2.
Figure 6B:
FIG. 6B illustrates an example clear image captured by an example imaging device, such as the example imaging device of FIG. 2.

Referring next to FIGS. 6A and 6B, blurry image 600A and clear image 600B depict two exemplary images taken according to the methods described herein. In particular, an imaging assembly (e.g., imaging engine device 100, imaging device 200, scan engine 520, etc.) captures a first image 600A. However, one or more imaging processors (e.g., scanning framework 525) determine a blurriness score for the image 600A according to a blurriness detection algorithm (e.g., as described herein with regard to FIG. 5) below a blurriness threshold. For example, in the exemplary embodiment of FIG. 6A, the imaging processors may determine the blurriness score to be approximately 140, and the blurriness threshold (e.g., a threshold above which the decode module is able to decode any decode indicia present) may be 210. As such, the imaging processors may determine that the blurry image 600A is too blurry to successfully decode a present decode indicia because the blurriness score image 600A is below the blurriness threshold. As such, a decode module (e.g., decoder 530) would be unable to decode the decode indicia and would discard the image 600A before sending a decode failure message to the imaging processor, wasting resources, time, bandwidth, and power. Using the instant techniques, however, the imaging processor determines that blurry image 600A is below a blurriness threshold and transmits instructions to the imaging assembly to modify a focus value of the imaging assembly (e.g., an actuator position for the imaging assembly). As such, the imaging assembly captures clear image 600B (e.g., with a blurriness score of approximately 280, over the blurriness threshold) and transmits the clear image 600B to a decode module, which is able to decode the decode indicia.

It will be understood that, although FIGS. 6A and 6B refer to blurriness scores as becoming clearer the greater the value, the opposite is envisioned as well (e.g., becoming more blurry as the blurriness score increases).

Figure 7:
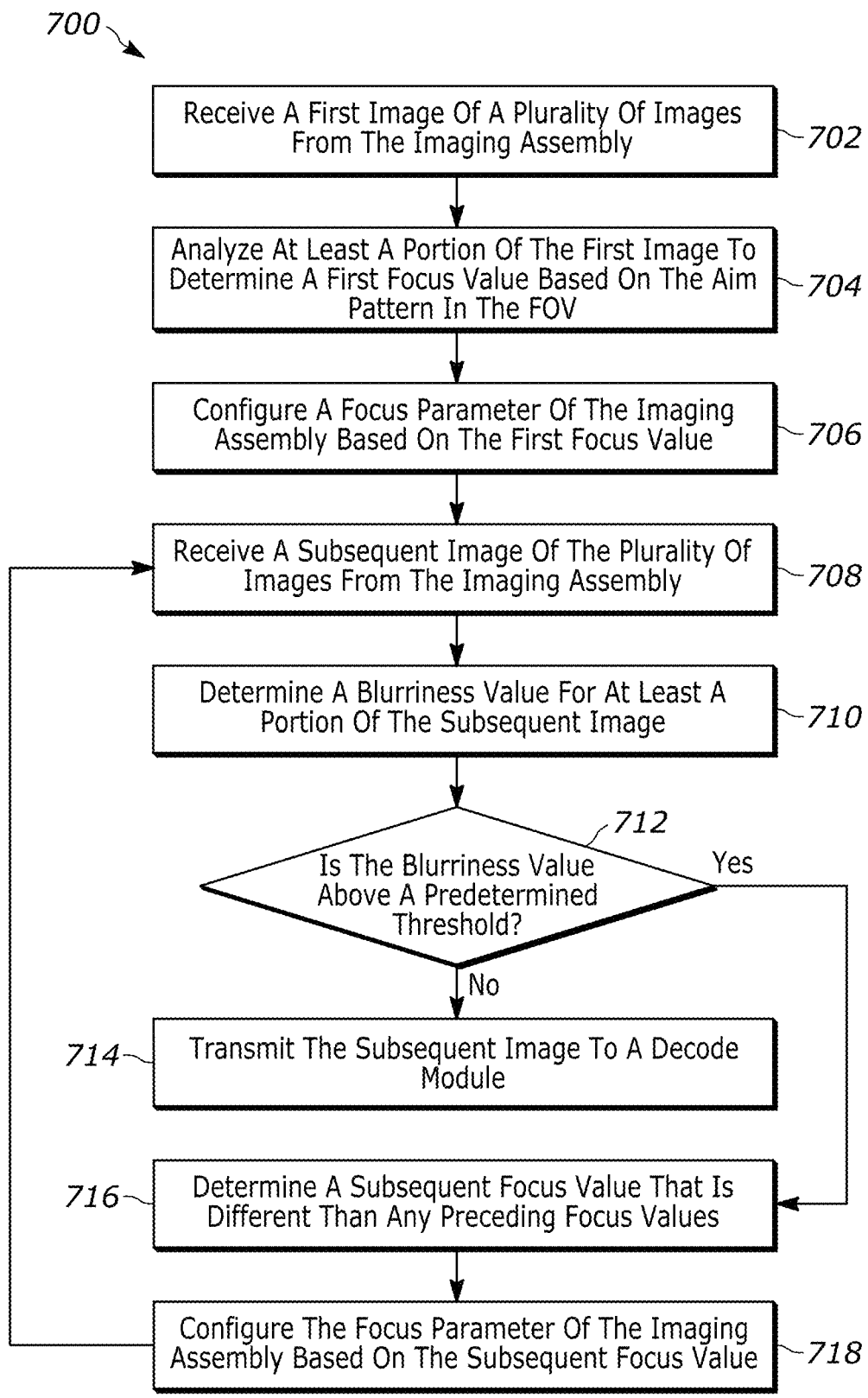
FIG. 7 illustrates a flow diagram of an example method for capturing images, detecting whether blur is present in the captured images, and adjusting an imaging assembly to eliminate further blur according to the techniques described herein.

Referring next to FIG. 7, the method 700 illustrates a flow diagram of an example method for capturing images, detecting blurriness, and determining whether to use an image for indicia decode applications. Although the method 700 is described below with regard to scan engine 520, scanning framework 525, and/or decoder 530 and components thereof as described with regard to FIG. 5, it will be understood that other similarly suitable imaging devices and/or components may be used instead (e.g., imaging engine device 100, imaging device 200, etc.).

At block 702, an imaging processor (e.g., scanning framework 525) receives a first image of a plurality of images from an imaging assembly (e.g., scan engine 520). Depending on the implementation, the imaging assembly may capture one or more images responsive to receiving a command from the imaging processor (e.g., event 502). In further implementations, the imaging assembly instead automatically begins capturing one or more images responsive to an object entering a FOV for the imaging assembly, receiving an input from a user via user interface, etc.

At block 704, the imaging processor analyzes at least a portion of the first image to determine a first focus value based on the aim pattern in the FOV. In some implementations, the imaging processor determines a focus value by determining a position for an actuator controlling one or more lens positions in the imaging assembly. In further implementations, the imaging processor uses a default position for the actuator and determines a value by which to adjust the actuator position. In still other implementations, the imaging processor determines which of multiple default positions to which to adjust the actuator and/or a value by which to subsequently adjust the actuator position.

Depending on the implementation, the imaging processor determines the focus value based on an aim pattern projected in the FOV by an aiming assembly associated with the imaging assembly. In some such implementations, the imaging processor determines the focus value according to the techniques described above with regard to FIGS. 3A-4B.

At block 706, the imaging processor then configures a focus parameter of the imaging assembly based on the first focus value. Depending on the implementation, the imaging processor may configure the focus parameter by transmitting a command to adjust a position of the actuator. In further implementations, the imaging processor may alternatively or additionally configure the focus parameter by transmitting an indication of a particular lens and/or imaging assembly to use for capturing the image(s).

At block 708, the imaging processor receives a subsequent image of the plurality of images from the imaging assembly. Depending on the implementation, the imaging assembly may capture and/or transmit the subsequent image after transmitting the first image to the imaging processor (e.g., after block 702), before transmitting the first image to the imaging processor, or while transmitting the first image to the imaging processor.

At block 710, the imaging processor determines a blurriness value for at least a portion of the subsequent image. Depending on the implementation, the portion of the subsequent image may include a region of interest (ROI) comprised of a predetermined area (e.g., number of pixels) surrounding the aim pattern, the area covered by the aim pattern, a predetermined percentage of the FOV for the imaging assembly positioned on a central axis of the image, a predetermined percentage of the FOV surrounding the aim pattern, the entire image, etc.

Depending on the implementation, the imaging processor may determine the blurriness value using one of several blurriness algorithm techniques. For example, the imaging processor may determine the blurriness value according to a Laplacian blur detection algorithm. In some such implementations, the imaging processor may use the Laplacian blur detection algorithm to determine a variance of the Laplacian values for the pixels to determine whether blur is present in the image and/or ROI. In further implementations, the imaging processor uses a Fast Fourier Transform (FFT) blur detection algorithm to shift the image to the frequency domain and compute a magnitude spectrum of the reconstructed image determine whether blur is present. In some implementations, the imaging processor performs the determination in real time. As such, the imaging processor may perform the determination fast enough to detect in between image captures (e.g., less than 16.67 ms, less than 15 ms, less than 10 ms, etc.).

At block 712, the imaging processor determines whether the blurriness value is above a predetermined threshold. If not, then flow continues to block 714. Otherwise, if the blurriness value is above the predetermined threshold, then flow continues to block 716. In some implementations, the predetermined threshold is programmed into the imaging processor at manufacture, initialization, calibration, etc. In further implementations, the predetermined threshold is based on user preferences (e.g., as input by the user into a user interface, as determined by the imaging processor via machine learning techniques, as received from a third-party computing device, etc.). In still further implementations, the imaging assembly and/or decode module may transmit an indication of the predetermined threshold to the imaging processor.

At block 714, the imaging processor transmits the subsequent image to a decode module (e.g., decoder 530). The decode module then performs a decode operation on a decode indicia (e.g., a barcode, QR code, digital watermark, etc.) visible in the image and transmits the decoded information to the imaging processor. In some implementations, the imaging processor transmits the portion of the image (e.g., the ROI) rather than the entire image.

At block 716, the imaging processor determines a subsequent focus value that is different than any preceding focus values and, at block 718, the imaging processor configures the focus parameter of the imaging assembly based on the subsequent focus value. In some implementations, the imaging processor performs blocks 716 and 718 similar to blocks 706 and 708. As such, implementations described with regard to blocks 706 and 708 similarly apply to blocks 716 and 718, respectively.

After block 718, the flow of method 700 returns to block 708 and continues to loop until the imaging processor determines at block 712 that the blurriness value is above the predetermined threshold, at which point the imaging processor transmits the image with the low blurriness value to the decode module and method 700 ends.

Depending on the implementation, the method 700 may perform the repeating blocks (e.g., blocks 708, 710, 712, 714, 716, or 718) differently in subsequently loops. For example, the method 700 may, on a subsequent loop, cause the imaging processor to determine the blurriness value (e.g., block 710) by determining a subsequent blurriness value different than the initial blurriness value. The imaging processor then determines the subsequent focus value (e.g., block 716) according to the subsequent blurriness value. In particular, the imaging processor may determine whether the subsequent blurriness value is greater than or less than a preceding blurriness value to determine whether the preceding focus value was in the correct direction. Put another way, if the subsequent blurriness value is greater than the preceding blurriness value, then the imaging processor determines that the preceding focus value was, for example, used in a command to adjust the actuator position in the wrong direction. As such, the imaging processor generates the subsequent focus value to adjust the position of the actuator in another (e.g., opposite) direction. Similarly, if the subsequent blurriness value is smaller than the preceding blurriness value, then the imaging processor determines that the preceding focus value was, for example, used in a command to adjust the actuator position in the correct direction and continues to generate the subsequent blurriness value in the corresponding direction.

It will be understood that the foregoing represents one potential implementation, and that other implementations may be envisioned. For example, in some implementations, a bi-optic barcode scanner may be used as the imaging device.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

The invention claimed is:

1. A variable focus imaging system, comprising:
    an imaging assembly configured to capture a plurality of images of an environment appearing in a field of view (FOV);
    an aiming assembly configured to project an aim pattern in the FOV; and
    one or more imaging processors configured to receive the plurality of images from the imaging assembly; and
    a computer-readable media storing machine readable instructions that, when executed, cause the one or more imaging processors to:
        (a) receive a first image of the plurality of images from the imaging assembly;
        (b) analyze at least a portion of the first image to determine a first focus value based on a position of the aim pattern in the FOV;
        (c) configure a focus parameter of the imaging assembly based on the first focus value;
        (d) receive a subsequent image of the plurality of images from the imaging assembly;
        (e) determine a blurriness value for at least a portion of the subsequent image;
        (f) responsive to the blurriness value being less than a predetermined threshold value, transmit the subsequent image to a decode module; and
        (g) responsive to the blurriness value exceeding the predetermined threshold value:
            determine a subsequent focus value that is different than any preceding focus values, the preceding focus values including the first focus value;
            configure the focus parameter of the imaging assembly based on the subsequent focus value; and
            repeat (d) through (g).

2. The variable focus imaging system of claim 1, wherein the imaging assembly includes an actuator and configuring the focus parameter includes:
    transmitting, to the imaging assembly, a command to adjust a position of the actuator.

3. The variable focus imaging system of claim 2, wherein repeating (d) through (g) includes:
    determining the blurriness value by determining a subsequent blurriness value; and
    determining the subsequent focus value by:
        determining that a subsequent blurriness value is greater than a preceding blurriness value; and
        determining the subsequent focus value based at least on the determining that the subsequent blurriness value is greater than a preceding blurriness value.

4. The variable focus imaging system of claim 3, wherein the command to adjust the position is a command to adjust the position in a first direction and repeating (d) through (g) includes:
    configuring the focus parameter based on the subsequent blurriness value by transmitting, to the imaging assembly, a command to adjust a position of the actuator in a second direction opposite of the first direction.

5. The variable focus imaging system of claim 2, wherein repeating (d) through (g) includes:
    determining the blurriness value by determining a subsequent blurriness value; and
    determining the subsequent focus value by:
        determining that a subsequent blurriness value is less than a preceding blurriness value; and
        determining the subsequent focus value based at least on the determining that the subsequent blurriness value is less than a preceding blurriness value.

6. The variable focus imaging system of claim 5, wherein the command to adjust the position is a command to adjust the position in a first direction and repeating (d) through (g) includes:
    configuring the focus parameter based on the subsequent blurriness value by transmitting, to the imaging assembly, a command to adjust the position of the actuator further in the first direction.

7. The variable focus imaging system of claim 1, wherein the at least a portion of the subsequent image includes a region of interest including a predetermined area surrounding the aim pattern in the FOV.

8. The variable focus imaging system of claim 1, wherein the at least a portion of the subsequent image includes a region of interest including a predetermined percentage of the FOV positioned on a central axis of the subsequent image.

9. The variable focus imaging system of claim 1, wherein determining the blurriness value includes:

calculating a variance of a gradient divergence for the at least the portion of the subsequent image; and
generating the blurriness value based on the variance.

10. The variable focus imaging system of claim 1, wherein determining the blurriness value includes:
shifting image data associated with the subsequent image into frequency domain data;
calculating a magnitude spectrum associated with the frequency domain data; and
generating the blurriness value based on the magnitude spectrum.

11. A method for capturing images via one or more imaging processors configured to receive a plurality of images of an environment appearing in a field of view (FOV) from an imaging assembly, the method comprising:
(a) receiving a first image of the plurality of images from the imaging assembly;
(b) analyzing at least a portion of the first image to determine a first focus value based on a position of an aim pattern in the FOV projected by an aiming assembly;
(c) configuring a focus parameter of the imaging assembly based on the first focus value;
(d) receiving a subsequent image of the plurality of images from the imaging assembly;
(e) determining a blurriness value for at least a portion of the subsequent image;
(f) responsive to the blurriness value being less than a predetermined threshold value, transmitting the subsequent image to a decode module; and
(g) responsive to the blurriness value exceeding the predetermined threshold value:
determining a subsequent focus value that is different than any preceding focus values, the preceding focus values including the first focus value;
configuring the focus parameter of the imaging assembly based on the subsequent focus value; and
repeating (d) through (g).

12. The method of claim 11, wherein the imaging assembly includes an actuator and configuring the focus parameter includes:
transmitting, to the imaging assembly, a command to adjust a position of the actuator.

13. The method of claim 12, wherein repeating (d) through (g) includes:
determining the blurriness value by determining a subsequent blurriness value; and
determining the subsequent focus value by:
determining that a subsequent blurriness value is greater than a preceding blurriness value; and
determining the subsequent focus value based at least on the determining that the subsequent blurriness value is greater than a preceding blurriness value.

14. The method of claim 13, wherein the command to adjust the position is a command to adjust the position in a first direction and repeating (d) through (g) includes:
configuring the focus parameter based on the subsequent blurriness value by transmitting, to the imaging assembly, a command to adjust a position of the actuator in a second direction opposite of the first direction.

15. The method of claim 12, wherein repeating (d) through (g) includes:
determining the blurriness value by determining a subsequent blurriness value; and
determining the subsequent focus value by:
determining that a subsequent blurriness value is less than a preceding blurriness value; and
determining the subsequent focus value based at least on the determining that the subsequent blurriness value is less than a preceding blurriness value.

16. The method of claim 15, wherein the command to adjust the position is a command to adjust the position in a first direction and repeating (d) through (g) includes:
configuring the focus parameter based on the subsequent blurriness value by transmitting, to the imaging assembly, a command to adjust the position of the actuator further in the first direction.

17. The method of claim 11, wherein the at least a portion of the subsequent image includes a region of interest including a predetermined area surrounding the aim pattern in the FOV.

18. The method of claim 11, wherein the at least a portion of the subsequent image includes a region of interest including a predetermined percentage of the FOV positioned on a central axis of the subsequent image.

19. The method of claim 11, wherein determining the blurriness value includes:
calculating a variance of a gradient divergence for the at least the portion of the subsequent image; and
generating the blurriness value based on the variance.

20. The method of claim 11, wherein determining the blurriness value includes:
shifting image data associated with the subsequent image into frequency domain data;
calculating a magnitude spectrum associated with the frequency domain data; and
generating the blurriness value based on the magnitude spectrum.

21. A device configured to receive a plurality of images of an environment appearing in a field of view (FOV) from an imaging assembly, the device comprising:
one or more imaging processors configured to receive the plurality of images from the imaging assembly; and
a computer-readable media storing machine readable instructions that, when executed, cause the one or more imaging processors to:
(a) receive a first image of the plurality of images from the imaging assembly;
(b) analyze at least a portion of the first image to determine a first focus value based on a position of an aim pattern in the FOV projected by an aiming assembly;
(c) configure a focus parameter of the imaging assembly based on the first focus value;
(d) receive a subsequent image of the plurality of images from the imaging assembly;
(e) determine a blurriness value for at least a portion of the subsequent image;
(f) responsive to the blurriness value being less than a predetermined threshold value, transmit the subsequent image to a decode module; and
(g) responsive to the blurriness value exceeding the predetermined threshold value:
determine a subsequent focus value that is different than any preceding focus values, the preceding focus values including the first focus value;
configure the focus parameter of the imaging assembly based on the subsequent focus value; and
repeat (d) through (g).

22. The device of claim 21, wherein the imaging assembly includes an actuator and configuring the focus parameter includes:
transmitting, to the imaging assembly, a command to adjust a position of the actuator.

23. The device of claim 22, wherein repeating (d) through (g) includes:
   determining the blurriness value by determining a subsequent blurriness value; and
   determining the subsequent focus value by:
      determining that a subsequent blurriness value is greater than a preceding blurriness value; and
      determining the subsequent focus value based at least on the determining that the subsequent blurriness value is greater than a preceding blurriness value.

24. The device of claim 23, wherein the command to adjust the position is a command to adjust the position in a first direction and repeating (d) through (g) includes:
   configuring the focus parameter based on the subsequent blurriness value by transmitting, to the imaging assembly, a command to adjust a position of the actuator in a second direction opposite of the first direction.

25. The device of claim 22, wherein repeating (d) through (g) includes:
   determining the blurriness value by determining a subsequent blurriness value; and
   determining the subsequent focus value by:
      determining that a subsequent blurriness value is less than a preceding blurriness value; and
      determining the subsequent focus value based at least on the determining that the subsequent blurriness value is less than a preceding blurriness value.

26. The device of claim 25, wherein the command to adjust the position is a command to adjust the position in a first direction and repeating (d) through (g) includes:
   configuring the focus parameter based on the subsequent blurriness value by transmitting, to the imaging assembly, a command to adjust the position of the actuator further in the first direction.

27. The device of claim 21, wherein the at least a portion of the subsequent image includes a region of interest including a predetermined area surrounding the aim pattern in the FOV.

28. The device of claim 21, wherein the at least a portion of the subsequent image includes a region of interest including a predetermined percentage of the FOV positioned on a central axis of the subsequent image.

29. The device of claim 21, wherein determining the blurriness value includes:
   calculating a variance of a gradient divergence for the at least the portion of the subsequent image; and
   generating the blurriness value based on the variance.

30. The device of claim 21, wherein determining the blurriness value includes:
   shifting image data associated with the subsequent image into frequency domain data;
   calculating a magnitude spectrum associated with the frequency domain data; and
   generating the blurriness value based on the magnitude spectrum.

* * * * *